United States Patent [19]

LeVine

[11] Patent Number: 5,392,601

[45] Date of Patent: Feb. 28, 1995

[54] EXHAUST SYSTEM FOR AN INTERNAL COMBUSTION ENGINE

[75] Inventor: David A. LeVine, Los Angeles, Calif.

[73] Assignees: Michael D. Epstein, McClean, Va.; Noah Weinberg, Jerusalem, Israel; Aish Hatorah, Lakewood, N.J.

[21] Appl. No.: 122,567

[22] Filed: Feb. 25, 1993

[51] Int. Cl.6 .............................. F01N 3/30
[52] U.S. Cl. ...................... 60/293; 60/313
[58] Field of Search ................. 60/293, 313

[56] References Cited

U.S. PATENT DOCUMENTS

| | | |
|---|---|---|
| 1,196,382 | 8/1916 | Moore . |
| 2,370,259 | 2/1945 | Rippingille . |
| 2,649,685 | 8/1953 | Cohen . |
| 2,717,583 | 9/1955 | Maybach et al. . |
| 3,364,909 | 1/1968 | Mick . |
| 3,613,359 | 10/1971 | Posh et al. . |
| 3,653,212 | 4/1972 | Gast et al. . |
| 3,662,541 | 5/1972 | Sawada et al. . |
| 3,690,105 | 9/1972 | Faulkner . |
| 3,708,980 | 1/1973 | Truxell . |
| 3,716,992 | 2/1973 | Stahl . |
| 3,751,915 | 8/1973 | Ranft et al. . |
| 3,772,887 | 11/1973 | Ziegler . |
| 3,906,722 | 9/1975 | Garcea . |
| 3,988,890 | 11/1976 | Abthoff et al. . |
| 4,022,019 | 5/1977 | Garcea . |
| 4,056,933 | 11/1977 | Nohira et al. . |
| 4,064,693 | 12/1977 | Shibata . |
| 4,069,666 | 1/1978 | Nakamura . |
| 4,133,175 | 1/1979 | Katoh . |
| 4,149,378 | 4/1979 | Nakamura et al. . |
| 4,151,715 | 5/1979 | Tachibana et al. . |
| 4,160,363 | 7/1979 | Furukubo . |
| 4,162,613 | 7/1979 | Tamura et al. . |
| 4,177,640 | 12/1979 | Kuroda et al. . |
| 4,192,846 | 3/1980 | Oya et al. . |
| 4,206,600 | 6/1980 | Feuling . |
| 4,207,738 | 6/1980 | Yoneda et al. . |
| 4,240,254 | 12/1980 | Nakase et al. . |
| 4,373,329 | 2/1983 | Martini . |
| 4,553,388 | 11/1985 | Okubo et al. . |
| 4,604,865 | 8/1986 | Otani et al. . |
| 4,621,494 | 11/1986 | Fujita . |
| 4,800,720 | 1/1989 | Okada . |
| 4,815,274 | 3/1989 | Piatti . |
| 4,835,965 | 6/1989 | Poehlman ........................ 60/313 |
| 4,884,399 | 12/1989 | Morris . |
| 5,010,731 | 4/1991 | Onishi . |
| 5,050,378 | 9/1991 | Clemmens ....................... 60/313 |
| 5,216,883 | 6/1993 | Flugger .......................... 60/313 |

FOREIGN PATENT DOCUMENTS 634616 1/1962 Canada .
697940 1/1931 France .

OTHER PUBLICATIONS

"M/T Power 'Y' Header: Mid-Range Makes the Difference," Speed & Custom Dealer: Selling Performance Ignition, a Babcox Automotive Publication.

U.S. Patent Application, filed Apr. 12, 1991, by Harold E. Friedman, entitled "Pollution Control System for Internal Combustion Engines."

*Primary Examiner*—Douglas Hart
*Attorney, Agent, or Firm*—Finnegan, Henderson, Farabow, Garrett & Dunner

[57] ABSTRACT

An exhaust system for an internal combustion engine includes a conduit in fluid communication with a combustion chamber for transferring exhaust gases from the combustion chamber. The exhaust system also includes a port disposed along the conduit for admitting supplemental air into the conduit so that the supplemental air combines with the exhaust gases and flows immediately in a direction downstream from the combustion chamber to draw the exhaust gases from the combustion chamber and to increase combustion of the exhaust gases.

17 Claims, 3 Drawing Sheets

EXHAUST SYSTEM FOR AN INTERNAL COMBUSTION ENGINE

BACKGROUND OF THE INVENTION

1. Field of the Invention

This invention relates to an exhaust system for an internal combustion engine and, more particularly, to an exhaust system having a conduit for transferring exhaust gases from the engine, as well as a port disposed along the conduit for admitting secondary air into the conduit to draw exhaust gases from the combustion chamber and to increase combustion of the exhaust gases.

2. Description of the Prior Art

Internal combustion engines produce emissions of exhaust gases, such as carbon monoxide, hydrocarbons and nitrogen oxides, that contribute to atmospheric pollution. The level of pollution is typically higher, oftentimes well beyond levels considered acceptable by federal and state emission guidelines, when the fuel burned by the engine is not fully combusted, i.e., in cases of incomplete combustion.

Various methods have been attempted to reduce the amount of polluting exhaust gases emanating from internal combustion engines. For example, as disclosed in U.S. Pat. No. 4,240,254, catalytic converters have been installed in exhaust systems to oxidize exhaust gases thereby reducing pollution. While generally effective in reducing pollution, catalytic converters have several disadvantages, including high cost, unreliability, warm-up time, creation of by-products, and reduction in power and efficiency of the engine.

Alternatively, as disclosed in U.S. Pat. Nos. 3,662,541 and 4,133,175, air may be combined with the exhaust gases leaving the combustion chamber to improve combustion and oxidation of exhaust gases while in the exhaust manifold. In the conventional exhaust systems, the additional air is mixed with the exhaust gases immediately adjacent the exhaust port of the cylinder head or within the cylinder block, and often in a direction opposite to the flow of the exhaust gases. A significant drawback to this arrangement is that a certain level of back pressure occurs as a result of mixing the additional air and the exhaust gases proximate the exhaust chamber, particularly if the air is directed against the flow of exhaust gases. The back pressure increases the force required for the pistons to push the exhaust gases out of the combustion chambers causing a corresponding reduction in the power and efficiency of the engine.

In addition, in conventional exhaust systems, such as those disclosed in U.S. Pat. Nos. 3,662,541, 4,133,175, and 4,240,254, the individual exhaust pipes from each exhaust chamber merge substantially close to the engine block into one or two common exhaust pipes that lead to a muffler and tailpipe assembly. The conventional systems do not take into consideration the temperature in the exhaust pipes in determining where to merge the exhaust pipes. As a consequence, the portion of exhaust not fully burned in the combustion chamber has less opportunity to burn in the individual exhaust pipes where the temperature is highest and the most efficient combustion occurs. Moreover, when the exhaust pipes merge, the exhaust gases create additional back pressure resulting from interference between the various pulses of exhaust gases exiting the individual exhaust pipes. The back pressure reduces the power and operational efficiency of the engine, while the interference inhibits combustion.

SUMMARY OF THE INVENTION

The present invention recognizes and avoids the problems characteristic of conventional exhaust systems. Accordingly, an object of the present invention is to provide an exhaust system for reducing polluting emissions produced by all internal combustion engines.

Another object of the present invention is to provide an exhaust system for an internal combustion engine which does not decrease and, in fact, increases the power, efficiency and gas mileage of the engine.

Another object of the present invention is to provide an exhaust system for an internal combustion engine in which supplemental air is added to exhaust gases in an exhaust pipe to draw exhaust gases out of a combustion chamber and increase the combustion and oxidation of the exhaust gases in the exhaust pipe.

Another object of the present invention is to provide an exhaust system for an internal combustion engine in which exhaust gases are maintained in exhaust pipes for an extended period of time to efficiently combust and oxidize the exhaust gases.

Another object of the present invention is to provide an exhaust system for an internal combustion engine in which pulses of exhaust gases from different exhaust pipes reach a coupling joint in alternation.

A further object of the present invention is to provide an exhaust system for an internal combustion engine which significantly minimizes or eliminates back pressure affecting engine operation.

Another object of the present invention is to provide an exhaust system for an internal combustion engine which admits or injects supplemental air into exhaust pipes at a point in the pipes where the exhaust gases therein are at or near their maximum temperature to facilitate complete combustion of exhaust particulars.

Additional objects and advantages of the invention will appear in the following description or may be obvious from the description, or may be learned by the practice of the invention. The stated objects and advantages of the invention may be realized and attained by the exhaust system particularly pointed out in the appended claims.

To achieve these objects and in accordance with the purpose of the invention, as embodied and broadly described herein, the invention comprises an exhaust system for an internal combustion engine comprising a conduit in fluid communication with a combustion chamber for transferring exhaust gases from the combustion chamber, and a port disposed along the conduit for admitting supplemental air into the conduit so that the to draw the exhaust gases from the combustion chamber and to increase combustion of the exhaust gases.

The invention further comprises a second conduit in fluid communication with a second combustion chamber for transferring exhaust gases from the second combustion chamber. Preferably, the first and second conduits merge downstream from a predetermined point on each of the conduits where the exhaust gases reach a maximum temperature. A second port is disposed along the second conduit for admitting a second flow of supplemental air into the second conduit so that the supplemental air combines with the exhaust gases and flows immediately in a second direction downstream from the second combustion chamber to draw gases from the second combustion chamber and to increase combustion of the exhaust gases.

BRIEF DESCRIPTION OF THE DRAWINGS

The accompanying drawings, which are incorporated in and constitute a part of the specification, illustrate preferred embodiments of the invention. Together with the written description, they serve to explain the objects, advantages and principles of the invention. In the drawings.

DESCRIPTION OF THE PREFERRED EMBODIMENTS

Figure 1:
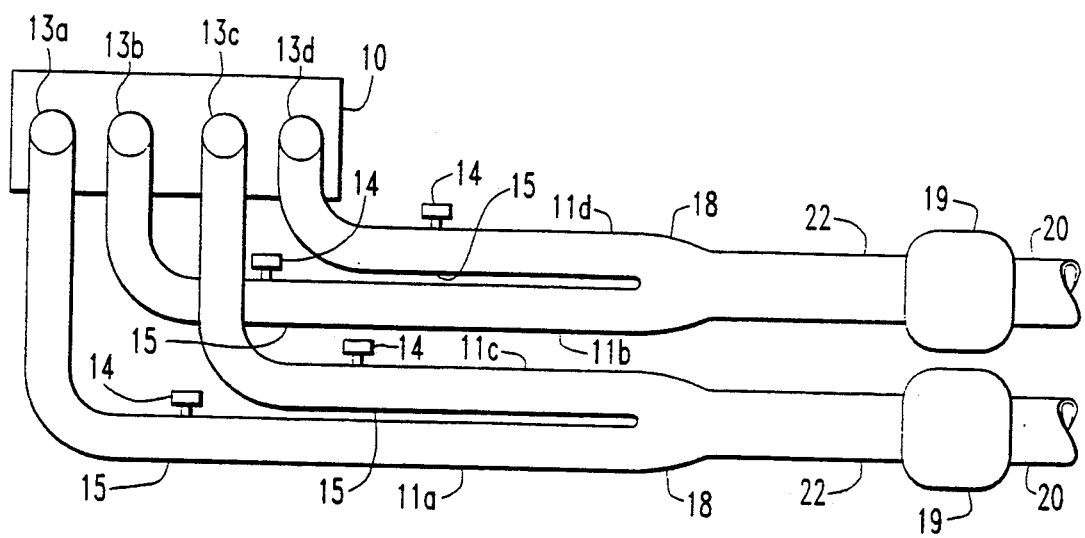
FIG. 1 is a diagram showing a side view of an exhaust system according to the present invention.

Reference will now be made in detail to the presently preferred embodiments of the invention, examples of which are illustrated in the accompanying drawings, in which like reference characters designate like parts in the drawings.

In accordance with the present invention, as broadly depicted in FIGS. 1 through 5, an exhaust system for an internal combustion engine 10 includes one or more conduits or exhaust pipes 11$a$–$h$, respectively, in fluid communication with a corresponding combustion chamber 12$a$–$h$. The exhaust pipe 11$a$, for example, provides a passageway for exhaust gases exiting the combustion chamber 12$a$ and includes an inlet 13$a$ connected to the engine 10.

In normal operation of the engine 10, fuel is periodically provided to the combustion chamber 12$a$ along with air, and the resulting fuel-air mixture is ignited. Initial combustion resulting from ignition urges a piston (not shown) within the combustion chamber 12$a$ to generate the power stroke of the piston. After ignition, exhaust gases exit the combustion chamber 12$a$, generally through an opened valve (not shown), and enter the exhaust pipe 11$a$, as the piston reciprocates, thereby forcing exhaust gases out of the combustion chamber 12$a$. If the engine 10 is a typical four-cycle engine, the piston reciprocates in accordance with the following sequence of steps: (1) injection of fuel and air into the chamber, (2) compression of the mixture within the chamber, (3) ignition of the mixture within the chamber, and (4) exhaust of gases from the chamber into the conduit 11$a$. The pistons in the combustion chambers 12$a$–$h$ each follow this cycle in turn in a repeated, sequential firing order. Preferably, the firing order of the combustion chambers is as follows: 12$a$, 12$h$, 12$f$, 12$b$, 12$g$, 12$c$, 12$d$, 12$e$. However, various different firing orders may be employed within the scope of the invention.

Exhaust gases, such as nitrogen oxides, carbon monoxide and hydrocarbons, generally continue to burn in the exhaust pipe 11$a$ after exiting the combustion chamber 12$a$. Indeed, the residual burning of exhaust gases in exhaust pipes 11$a$–$h$ causes the temperature of the exhaust gases to increase within each exhaust pipe 11$a$–$h$ for a certain distance due to various factors relating to the volume of unburned particles exiting the combustion chambers 12$a$–$h$. Such factors include the type of fuel, the proportion of air to fuel, the quality of the engine, etc.

In accordance with the present invention, a port or gulp valve 14 is disposed along each exhaust pipe 11$a$–$h$ for admitting supplemental air into the exhaust pipe, so that the supplemental air enters each conduit 11$a$–$h$ and flows immediately in a direction downstream from the combustion chamber 12$a$–$h$. As embodied herein and shown in FIGS. 1 and 2, for example, the port 14 is spaced downstream from the inlet 13$a$. The addition of the supplemental air to the exhaust gases in the exhaust pipe 11$a$ increases the flow of fluid in the exhaust pipe, thus relieving back pressure upstream from the exhaust pipe 11$a$. The reduced pressure draws exhaust gases from the upstream portion of the exhaust pipe 11$a$ and the combustion chamber 12$a$. Since the gases are drawn out of the combustion chamber 12$a$ during the exhaust stroke of the piston, the piston requires less force to expel the exhaust gases from the combustion chamber than if the supplemental air had not been added. Therefore, the power and efficiency of the engine is improved.

As embodied herein, the supplemental air admitted by the ports 14 includes oxygen and therefore advantageously increases combustion of the exhaust gases in the exhaust pipes 11$a$–$h$. The increased combustion of the exhaust gases in each exhaust pipe 11$a$–$h$ oxidizes the exhaust gases to reduce undesirable pollutants to carbon dioxide and water vapor. It is thus desirable to maintain the exhaust gases and supplemental air in the exhaust pipes 11$a$–$h$ to allow the exhaust gases to combust before they are released into the atmosphere.

In accordance with the present invention and as shown in FIG. 1, the port 14 is preferably mounted on the first conduit 11$a$ spaced from the inlet 13$a$ and preferably at or about the predetermined point 15 where the exhaust gases are at or about (i.e.., slightly before or slightly after) a maximum temperature after leaving the combustion chamber 12$a$ and where the admission of supplemental air creates suction sufficient to draw exhaust gases from the combustion chamber 12$a$. This predetermined point may vary depending on factors such as the type of fuel, the proportion of air to fuel, the quality of the engine, etc. Such placement of the port 14 along the conduit 11$a$, rather than placement within or immediately adjacent the engine 10, provides for superior combustion of the exhaust gases to thereby reduce emission of pollutants and increase the engine's power and efficiency. Preferably, however, the exhaust gases cool to below the temperature at which combustion occurs while in the conduit 11$a$.

Figure 4:
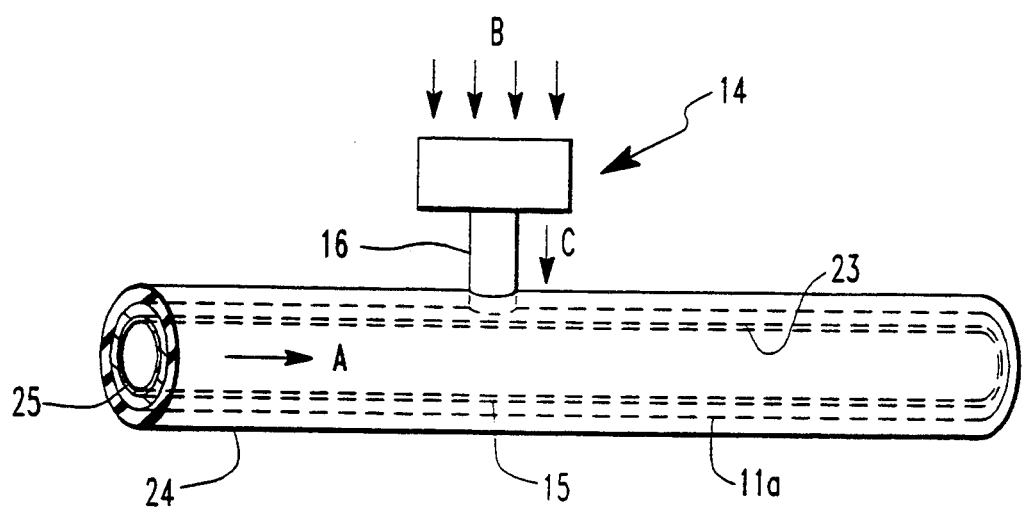
FIG. 4 is a diagram showing a side view of the exhaust system of the present invention with a gulp valve mounted on an exhaust pipe.
Figure 5:
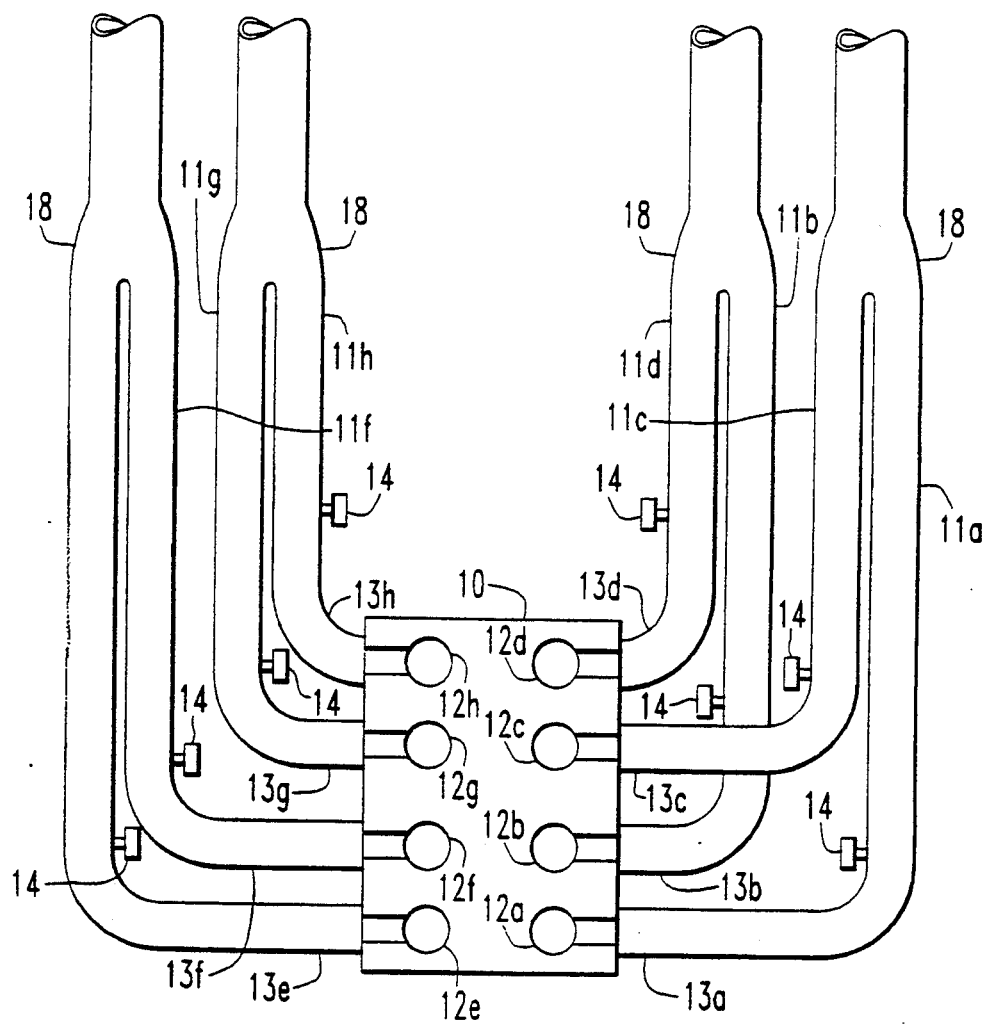
FIG. 5 is a diagram showing a top view of the exhaust system of FIG. 1 and also depicting a preferred arrangement of exhaust pipes with respect to the engine.

Therefore, as shown in FIGS. 1 and 5, one or more exhaust pipes. 11$a$–$h$ are in fluid communication with a combustion chamber 12$a$–$h$, respectively, for transferring exhaust gases. First and second conduits 11$a$, 11$c$, for example, merge downstream from a predetermined point 15 on each of the conduits where the exhaust gases reach a maximum temperature. A second port 14 is disposed along the second conduit 11$c$ for admitting a second flow of supplemental air into the second conduit. Upon entering the second conduit 11$c$, the second flow of supplemental air flows immediately in a second direction downstream from the second combustion chamber 12c. The interaction of the second flow of supplemental air with the exhaust gases in the second combustion chamber 12c and the second conduit 11c is similar to the interaction of the first flow of secondary air with the first combustion chamber 12a and first conduit 11a, As shown in FIG. 4, the ports 14 permit supplemental air flow into each of the exhaust pipes 11a–h (as shown by arrows B and C), but not in the reverse direction. In the typical gulp valve, the supplemental air is drawn into the exhaust pipes 11a–h by the flow Of passing exhaust gases. The supplemental air then mixes with the flow of exhaust gases (as shown by arrow A) traveling through the exhaust pipes 11a–h. In order to ensure that no exhaust gases undesirably flow out of the port 14 and flow into the vehicle ventilation system, for example, the port 14 may comprise a one way valve 16 including a ball and spring check valve or a leaf spring as is commonly known. The port 14 may also include an intake muffler, filter or baffle 17 for quieting the flow of supplemental air though the port and filtering particles from the supplemental air before introduction into the one way valve 16 or exhaust pipe 11a. The muffler may simply comprise, for example, a filter member such as steel wool disposed within a tube which is in communication with the one way valve 16.

As shown principally in FIG. 5, the exhaust system of the present invention may be used advantageously in an internal combustion engine 10 having a plurality of combustion chambers 12a–h in fluid communication with corresponding exhaust pipes or conduits 11a–h. As embodied herein, one or more ports 14 are spaced from the combustion chamber 12 along each of the exhaust pipes 11a–h, and the ports 14 are preferably located proximate the location, which is identified by reference numeral 15, in each conduit where the temperature is typically highest. In addition, two or more sets of conduits, such as exhaust pipes 11a and 11c, are coupled at joint 18 located downstream from the predetermined point 15. Preferably, the exhaust pipes 11a–h and coupling joint 18 are dimensioned so that exhaust gases flow in sequence to the coupling joint 18, thereby providing a substantially constant level of suction in the exhaust line. Joining together more than two exhaust pipes 11a–h, or joining together two exhaust pipes (e.g. exhaust pipes 11d and 11h) on opposite sides of the engine, at one coupling joint 18 is also contemplated within the scope of the invention, as long as the beneficial effects of improved combustion and lack of flow interference are maintained.

Thus, in accordance with the present invention, as embodied herein and shown in FIGS. 1 and 5, individual exhaust pipes 11a, 11c are separated from each other for a substantial distance and, in any case, beyond the predetermined location 15 in each conduit where the temperature is the highest. The exhaust gases burn more fully in the exhaust pipes 11a–h if the individual pockets of gases caused by individual piston firings are kept separated due to less interference between pockets. In systems where the pockets of exhaust gases are mixed soon after passing out of the engine 10, the individual pockets of combustion may be extinguished by the interference between pockets increasing pollution, or the burning exhaust gases may travel from one exhaust pipe backwards into another or may interfere with other pockets' flow causing increased back pressure.

Figure 2:
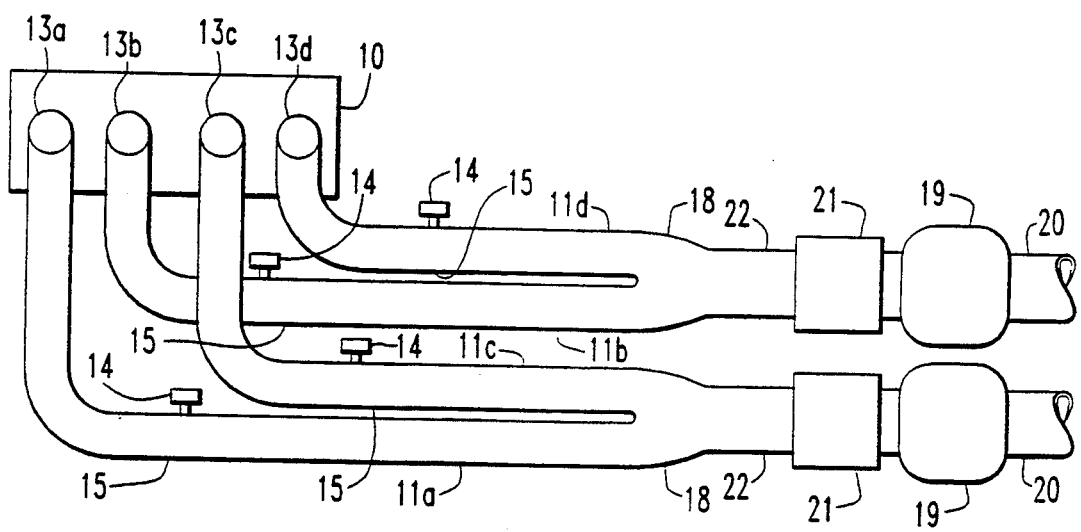
FIG. 2 is a diagram showing a side view of the exhaust system of FIG. 1 and also including a catalytic converter.

As shown in FIG. 1, a muffler 19 and tailpipe 20 may be utilized in fluid communication with the coupling joint 18. While the exhaust system as depicted in FIG. 1 markedly decreases the amount of pollutants emitted by the engine 10, a catalytic converter 21, as shown in FIG. 2, may be employed to reduce emissions even further. However, a catalytic converter is not necessary for the practice of the present invention.

Figure 3:
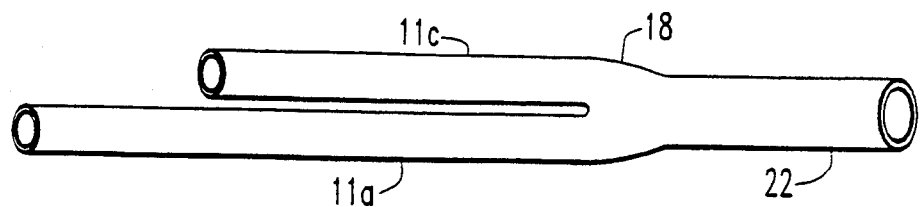
FIG. 3 is a diagram showing a side view of a coupling joint of the exhaust system according to the present invention.

As shown in FIGS. 1–3, the exhaust system further includes an intermediate pipe 22 secured to and in fluid communication with the coupling joint. The cross-sectional area of the intermediate pipe 22 is about twice as large as the cross sectional area of one of the exhaust pipes 11a, 11c. The increasing cross-sectional area allows the exhaust gases to flow smoothly and merge together to form a continuous flow as the individual pockets pass through the coupling Joint 18 in alternation. If the cross-sectional area of the intermediate pipe 22 were smaller, the merging flows could interfere with each other causing undesirable back pressure. Further, the suction that draws gases out of the combustion chambers and draws secondary air through the ports would be substantially decreased or destroyed.

As shown in FIG. 4, each exhaust pipe 11a defines an inner surface 23 with the corresponding gulp valve 14 being disposed radially outside of the inner surface. Such an arrangement allows the supplemental air to immediately flow downstream upon admission into the exhaust pipe 11a. Further, the flow of the exhaust gases through the exhaust pipe 11a is not hindered by any obstruction in the pipe.

As shown in FIG. 4, an insulation layer 24 may be disposed around the exhaust pipe 11a to keep heat within the exhaust pipe and thereby improve combustion. The exhaust pipes may be made of stainless steel, or of some other metal, or of a high temperature resistant ceramic material. The inner surfaces 23 of the exhaust pipes may be coated with a ceramic or reflective coating 25 in order to keep heat within the exhaust pipes, or to improve flow or combustion. Preferably, bending of the exhaust pipes is kept to a minimum.

The operation of the exhaust system shown in FIGS. 1–5 will now be described. The engine 10 produces exhaust gases in the combustion chambers 12a–h when the pistons fire. These exhaust gases pass through the inlets 13a–h into the exhaust pipes 11a–h. The exhaust gases in the exhaust pipes 11a–h continue to burn and pass through the coupling Joints 18 in alternation to draw exhaust gases out of the combustion chambers 12a–h. Ports 14 are provided on each exhaust pipe 11a–h for admitting supplemental air into the exhaust pipes to further the combustion of the exhaust gases and to draw gases out of the combustion chambers 12a–h. The supplemental air is drawn into the exhaust pipes 11a–h by virtue of the arrangement of the exhaust pipes and coupling joints 18, as well as the placement of the ports 14 proximate the location where the exhaust gases typically are highest in temperature. The exhaust gases and secondary air pass though the exhaust pipes 11a–h, coupling Joints 18, intermediate pipes 22, (optionally through a catalytic converter 21), muffler 19 and tailpipe 20.

It will be apparent to those skilled in the art that modifications and variations can be made in the exhaust system of the present invention without departing from the scope or spirit of the invention. For example, the ports 14 may include or consist essentially of air injectors for admitting air into the exhaust pipes in timed sequence in relation to engine cycle. Also, the number of exhaust pipes 11a–h corresponds to and is a function of the number of combustion chambers 12a–h in the engine. The present invention is depicted for illustrative purposes only as including eight exhaust pipes 11a–h connected to eight combustion chambers 12a–h, but can be used with internal combustion engines having any number of combustion chambers with only minimal rearrangement of the exhaust pipes 11 and/or coupling joints 18. Additionally, the present invention can be used with all types of internal combustion engines including, but not limited to, gasoline and diesel engines. Thus, it is intended that the present invention cover the modifications and variations provided that they come within the scope of the appended claims and their equivalents.

What is claimed is:

1. An exhaust system for an internal combustion engine comprising:
   a conduit in fluid communication with a combustion chamber for transferring exhaust gases from said combustion chamber, said conduit having a first end adjacent said combustion chamber, a second end distant from said combustion chamber, said exhaust gases within said conduit heating said conduit to a point of maximum temperature disposed along said conduit between said first and second ends, whereby acoustic waves within said conduit reflect off said second end and produce alternating high and low pressure conditions within said conduit; and
   a valve mounted on said conduit substantially at said point, said valve being vented to an ambient atmosphere for admitting supplemental air from said ambient atmosphere into said conduit when the pressure within said conduit at said point is below the pressure of said ambient atmosphere, so that said supplemental air combines with said exhaust gases.

2. The exhaust system of claim 1, further comprising:
   a second conduit in fluid communication with a second combustion chamber for transferring exhaust gases from said second combustion chamber, said second conduit having a first end adjacent said combustion chamber, a second end distant from said second combustion chamber, said exhaust gases within said second conduit heating said second conduit to a point of maximum temperature disposed along said second conduit between said first and second ends, whereby acoustic waves within said second conduit reflect off said second end to produce alternating high and low pressure conditions within said second conduit, said first and second conduits merging downstream from said maximum temperature points; and
   a second valve mounted on said second conduit substantially at a corresponding one of said points, said valve being vented to an ambient atmosphere for admitting a second flow of supplemental air from said ambient atmosphere into said second conduit when the pressure within said second conduit at said corresponding point is below the pressure of said ambient atmosphere, so that said supplemental air combines with said exhaust gases.

3. The exhaust system of claim 1, wherein said valve permits supplemental air flow into said conduit but precludes exhaust gas flow out of said port.

4. The exhaust system of claim 1, wherein said valve includes a one way check valve.

5. The exhaust system of claim 1, wherein said valve includes a one way leaf spring valve.

6. The exhaust system of claim 1, wherein said valve includes an intake muffler.

7. An exhaust system for removing exhaust gases from an internal combustion engine having a plurality of combustion chambers, the system comprising:
   a pair of exhaust pipes, each in fluid communication with a corresponding combustion chamber and having a first end adjacent said corresponding combustion chamber, a second end distant from said corresponding combustion chamber, said exhaust gases within each of said pipes heating said pipe to a point of maximum temperature disposed along said pipe between said first and second ends, whereby acoustic waves within each of said pipes reflect off said second end to produce alternating high and low pressure conditions within said pipe;
   at least one gulp valve mounted on each of said exhaust pipes at said maximum temperature point, each of said valves being vented to an ambient atmosphere for admitting supplemental air from said ambient atmosphere into a corresponding pipe when the pressure within said corresponding pipe at said point is below the pressure of said ambient atmosphere; and
   a coupling joint joining said second ends of said pair of exhaust pipes downstream from said gulp valves and at a location of decreasing temperature within said exhaust pipes.

8. The exhaust system of claim 7, further including a muffler and tailpipe in fluid communication with said coupling joint.

9. The exhaust system of claim 7, further including a catalytic converter in fluid communication with said coupling joint.

10. The exhaust system of claim 7, further including an intermediate pipe secured to and in fluid communication with said coupling joint, the cross-sectional area of said intermediate pipe being about twice as large as the cross-sectional area of one of said exhaust pipes.

11. The exhaust system of claim 7, wherein each of the exhaust pipes defines an inner surface and the corresponding gulp valve is disposed radially outside of said inner surface.

12. The exhaust system of claim 7, wherein the length of each of said exhaust pipes between said first and second ends is such that said exhaust gases have cooled below combustion when reaching said coupling joint.

13. The exhaust system of claim 7, further including an insulation layer disposed about said exhaust pipes to reduce heat loss from said exhaust pipes.

14. The exhaust system of claim 7, wherein an interior portion of each of said exhaust pipes is coated with an insulation layer, thereby increasing combustion and reducing heat loss from said exhaust pipe.

15. The exhaust system of claim 7, wherein said exhaust pipes are made of a ceramic material.

16. An exhaust system for removing the exhaust gases from an internal combustion engine having a plurality of combustion chambers, the system comprising:
   a plurality of exhaust pipes, each in fluid communication with a corresponding combustion chamber and having a first end adjacent said corresponding combustion chamber, a second end distant from said corresponding combustion chamber, said exhaust gases within each of said pipes heating said pipe to a point of maximum temperature disposed along said pipe between said first and second ends, whereby acoustic waves within each of said pipes reflect off said second end of said pipe to produce alternating high and low pressure conditions within said pipe;

a plurality of coupling joints, each joining together two of said second ends of said exhaust pipes; and a plurality of gulp valves, each mounted on one of said exhaust pipes at said maximum temperature point, each of said valves being vented to an ambient atmosphere for admitting supplemental air from said ambient atmosphere into a corresponding pipe when the pressure within said corresponding pipe at said point is below the pressure of said ambient atmosphere.

17. The exhaust system of claim 16, including eight of said exhaust pipes, said exhaust chambers exhausting gases to said exhaust pipes in a repeated, sequential firing order from one to eight, a first pair of said exhaust pipes joined by a corresponding coupling Joint receiving gases from firings one and six, a second pair of said exhaust pipes joined by a corresponding coupling joint receiving gases from firings two and five, a third pair of said exhaust pipes joined by a corresponding coupling joint receiving firings three and eight, and a fourth pair of said exhaust pipes joined by a corresponding coupling joint receiving firings four and seven.

* * * * *